(12) United States Patent
Socolovsky et al.

(10) Patent No.: US 10,934,225 B2
(45) Date of Patent: Mar. 2, 2021

(54) COMPACTION OF POLYHALITE AND POTASH MIXTURE

(71) Applicant: ICL Europe Cooperatief U.A., Amsterdam (NL)

(72) Inventors: Ruben Socolovsky, Beer Sheva (IL); Khalil Abu-Rabeah, Beer Sheva (IL); Ayoub Alhowashla, Hora (IL); Yacov Levy, Dimona (IL); Natalia Geinik, Arad (IL); Nizbert Mavhunga, Redcar (GB); Ofir Cohen, Arad (IL)

(73) Assignee: ICL EUROPE COOPERATIEF U. A., Amsterdam (NL)

( * ) Notice: Subject to any disclaimer, the term of this patent is extended or adjusted under 35 U.S.C. 154(b) by 0 days.

(21) Appl. No.: 16/623,074

(22) PCT Filed: Jun. 12, 2018

(86) PCT No.: PCT/IL2018/050639
§ 371 (c)(1),
(2) Date: Dec. 16, 2019

(87) PCT Pub. No.: WO2018/229757
PCT Pub. Date: Dec. 20, 2018

(65) Prior Publication Data
US 2020/0157014 A1    May 21, 2020

Related U.S. Application Data

(60) Provisional application No. 62/519,903, filed on Jun. 15, 2017.

(51) Int. Cl.
*C05D 1/00* (2006.01)
*C05G 5/12* (2020.01)

(52) U.S. Cl.
CPC ............ *C05D 1/005* (2013.01); *C05G 5/12* (2020.02)

(58) Field of Classification Search
CPC ............ C05D 1/00; C05D 1/005; C05G 5/12
USPC ...................................... 23/313 R
See application file for complete search history.

(56) References Cited

U.S. PATENT DOCUMENTS 9,592,514 B2 * 3/2017 Kaps .................... B01J 2/22

* cited by examiner

*Primary Examiner* — Edward M Johnson
(74) *Attorney, Agent, or Firm* — Graeser Associates International Inc.; Dvorah Graeser

(57) ABSTRACT

There is provided herein a process for the compaction of Polyhalite with a Potassium salt, wherein said process comprising: mixing a feed of polyhalite with a feed of said Potassium salt in a mixer to yield a mixture; compacting said mixture in a compactor to yield masses; crushing said masses in a crusher to yield particles; screening said particles in a screener to yield fine particles in three different sizes: oversized fine particles which undergo a second crushing process and are retuned to said screener for screening, undersized fine particles which are transferred to said mixer for further mixing, and desired size fine particles which are transferred to a polish screener glazing, drying and oiling.

6 Claims, 2 Drawing Sheets

COMPACTION OF POLYHALITE AND POTASH MIXTURE

FIELD OF THE INVENTION

The present invention relates to the field of fertilizers, specifically to production of compacted polyhalite and potash mixture to act as a fertilizer.

BACKGROUND OF THE INVENTION

To grow properly, plants need nutrients (nitrogen, potassium, calcium, zinc, magnesium, iron, manganese, etc.) which normally can be found in the soil. Sometimes fertilizers are needed to achieve a desired plant growth as these can enhance the growth of plants.

This growth of plants is met in two ways, the traditional one being additives that provide nutrients. The second mode by which some fertilizers act is to enhance the effectiveness of the soil by modifying its water retention and aeration. Fertilizers typically provide, in varying proportions, three main macronutrients:

Nitrogen (N): leaf growth;
Phosphorus (P): Development of roots, flowers, seeds, fruit;
Potassium (K): Strong stem growth, movement of water in plants, promotion of flowering and fruiting;
three secondary macronutrients: calcium (Ca), magnesium (Mg), and sulphur (S);
micronutrients: copper (Cu), iron (Fe), manganese (Mn), molybdenum (Mo), zinc (Zn), boron (B), and of occasional significance there are silicon (Si), cobalt (Co), and vanadium (V) plus rare mineral catalysts.

The most reliable and effective way to make the availability of nutrients coincide with plant requirements is by controlling their release into the soil solution, using slow release or controlled release fertilizers.

Both slow release fertilizers (SRF) and controlled release fertilizers (CRF) supply nutrients gradually. Yet, slow release fertilizers and controlled release fertilizers differ in many ways: The technology they use, the release mechanism, longevity, release controlling factors and more.

Solid fertilizers include granules, prills, crystals and powders. A prilled fertilizer is a type of granular fertilizer which is nearly spherical made by solidifying free-falling droplets in air or a fluid medium. Most controlled-release fertilizers (CRFs) used in commercial nurseries are prilled fertilizers that have been coated with sulfur or a polymer. These products have been developed to allow a slow release of nutrients into the root zone throughout crop development.

Polyhalite is an evaporite mineral, a hydrated sulfate of potassium, calcium and magnesium with formula: $K_2Ca_2Mg(SO_4)_4 \cdot 2H_2O$. Polyhalite is used as a fertilizer since it contains four important nutrients and is low in chloride:

48% $SO_3$ as sulfate
14% $K_2O$
6% MgO
17% CaO

Potash refers to potassium compounds and potassium-bearing materials, the most common being potassium chloride (KCl). Potassium is the third major plant and crop nutrient after nitrogen and phosphorus. It has been used since antiquity as a soil fertilizer (about 90% of current use). Elemental potassium does not occur in nature because it reacts violently with water. As part of various compounds, potassium makes up about 2.6% of the weight of the Earth's crust and is the seventh most abundant element, similar in abundance to sodium at approximately 1.8% of the crust. Potash is important for agriculture because it improves water retention, yield, nutrient value, taste, color, texture and disease resistance of food crops. It has wide application to fruit and vegetables, rice, wheat and other grains, sugar, corn, soybeans, palm oil and cotton, all of which benefit from the nutrient's quality enhancing properties.

SUMMARY OF THE INVENTION

According to some demonstrative embodiments, there is provided herein a process for the compaction of Polyhalite with a Potassium salt, wherein said process comprising: mixing a feed of polyhalite with a feed of said Potassium salt in a mixer to yield a mixture; compacting said mixture in a compactor to yield masses; crushing said masses in a crusher to yield particles; and screening said particles in a screener to yield different particles in three different sizes: oversized particles which undergo a second crushing process and are retuned to said screener for screening, undersized particles which are transferred to said mixer for further mixing, and desired size granular particles which are transferred to a polish screener.

According to some embodiments, the Potassium salt may include at least one of Potash, Potassium Nitrate and Potassium Sulphate, or any other form of Potash.

According to some embodiments, the process may be a wet process including the addition of a binder.

According to some embodiments, the binder may be added to the mixer with said feed of polyhalite and said feed of Potassium salt.

According to some embodiments, the binder may be selected from the group including starch, bentonite, sodium silicate, lignosulfonates, molasses, hydrated lime, bitumen, Portland cement, clay, acids (nitric, hydrochloric, phosphoric, sulphuric), cellulose gum, sucrose, water, water glass, cements, Fly Ash, Potassium and Sodium Silicate, MgO, CaO, Alganite, Geo-polymers, oils and waxes and the like, or a combination thereof.

According to some embodiments, the process is a dry process wherein said mixture is heated in a heater after being mixed in said mixer.

BRIEF DESCRIPTION OF THE DRAWINGS

The present invention will become fully understood from the detailed description given herein below and the accompanying drawings, which are given by way of illustration and example only, and thus not limiting in any way, wherein.

DETAILED DESCRIPTION OF THE INVENTION

Figure 1:
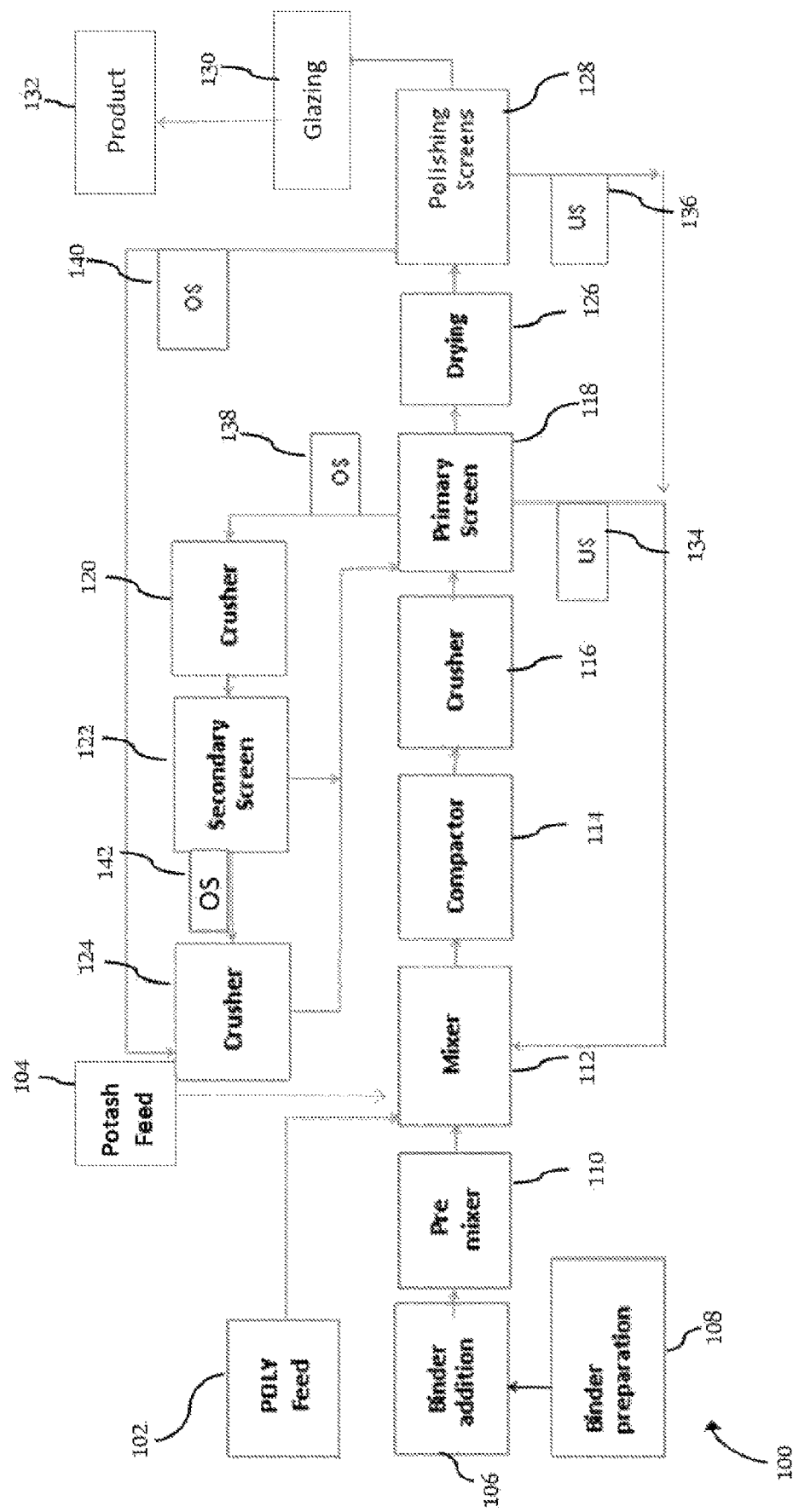
FIG. 1 is a schematic illustration of a wet process for the compaction of Polyhalite and a potassium salt in accordance with some demonstrative embodiments.

According to some demonstrative embodiments, there is provided a process for the compaction of a polyhalite and potash mixture (the mixture may also be referred to as "PotahPlus®").

According to some demonstrative embodiments, there is provided a compacted polyhalite and potash mixture.

According to some embodiments, there is provided herein a process for mixing Potash with Polyhalite, wherein the concentration of Potash in the mixture may be in the range between 0%-95% w/w Potash.

According to some embodiments, the process may preferably include compacting of 50% w standard Potash and 50% w Polyhalite.

According to some embodiments, the compaction may a dry compaction and according to other embodiments, the compaction may be a wet compaction.

According to some embodiments, the compaction process may include the addition of a binder.

According to some embodiments, the binder, as referred to herein, may include but not limited to any suitable material or compound that may mechanically and/or chemically hold or draw other materials together to form a cohesive whole, including, for example, organic or inorganic binders, such as, starch, bentonite, sodium silicate, ligno-sulfonates, molasses, hydrated lime, bitumen, Portland cement, clay, acids (nitric, hydrochloric, phosphoric, sulphuric), cellulose gum, sucrose, water, water glass, cements, Fly Ash, Potassium and Sodium Silicate, MgO, CaO, Alganite, Geo-polymers, oils and waxes and the like, or a combination thereof.

According to some demonstrative embodiments, the binder may be added in a concentration ranging between 0.5-20% w/w, preferably between 3-7% w/w.

According to some demonstrative embodiments, the addition of a binder to the process improves the compaction process, enhances the strength of the resulting granules (also referred to herein as flakes) and diminishes the abrasion of the final product, e.g., when the final resulting product is transported). According to some embodiments, the resulting product may have a low abrasion level.

According to some embodiments, when the compaction is a wet compaction, in addition to the binder, water may be added as well.

According to some embodiments, the compaction may be conducted at high feeding temperatures. In addition, the quality of the compacted product may be higher as the Potash level increases.

According to some demonstrative embodiments, the dry compaction process may include the following steps:

Mixing Potash with Polyhalite, optionally with an organic or inorganic binder like gum guar, polymers geo-polymers acids or basic additives, and other additives may be added at this stage as well;

The mixture may be heated to a temperature between 80-180° C., preferably 160° C.

Feeding the mixture into a compactor to provide compacted flakes; Grinding of the flakes;

Sieving of the grinded flakes; and

According to some embodiments, after sieving there are three types of yield:
1. Desired sized flakes—between 14-33 mm thickness, S.G. between 1.9 to 2.4 g/cm$^3$. According to some embodiments, the desired size of the flakes (also referred to herein as "particles" or "granules") is between 1-6 mm, most preferably between 2-4 mm.
2. Oversized (OS) flakes—are returned to the grinding stage, e.g., between 4-20% w/w of the total resulting flakes.
3. Undersized (US) flakes—are returned to the mixture for compaction, e.g., between 10 to 70% w/w of the total resulting flakes.

According to some embodiments, in the dry process, optionally a binder may be added in a concentration of between 0.01-7% w/w, preferably between 1-5% w/w, most preferably between 2-4% w/w.

According to some embodiments, oil may be added to the resulting granules, e.g., to improve the rheology of the product and diminish dust formation. For example in an amount between 3000-5000 ppm, preferably 3000 ppm. According to some embodiments, any suitable oil may be used, including for example, mineral oil or similar, slack wax or similar, paraffin wax or similar or mixture of them According to some demonstrative embodiments, the process may include unique conditions to enable to effective compaction of Potash and Polyhalite, including high temperatures ranging from 80 to 190° C. preferably 160° C. and high force conditions ranging from 45 to 100 kN/cm, preferably 55 kN/cm and Flack thickness between 1.4 mm to 33 mm. According to some embodiments, the desired size of the flakes is between 1-6 mm, most preferably between 2-4 mm.

According to some demonstrative embodiments, the present invention allows for the effective compaction of polyhalite which is difficult to compact under regular conditions due to the difficulty in achieving deformation of polyhalite particles.

According to some embodiments the addition of Potash, Phosphate compounds or Potassium Nitrate to Polyhalite and the unique conditions described herein enable to overcome the difficulties of compacting Polyhalite and to effectively provide compacted granules of with addition of phosphate compounds, Potassium Nitrate or Potassium Sulfate According to some demonstrative embodiments, the process of the present invention may also be effective when Potash is replaced with Potassium Nitrate and/or Potassium Sulphate. In these cases the Phosphates compounds or Potassium Nitrate will be added to Polyhalite and the unique conditions described herein enable to overcome the difficulties of compacting Polyhalite and to effectively provide compacted granules of polyhalite with potash, phosphate compounds or potassium Nitrate or Potassium Sulfate optionally with addition of a binder.

According to some embodiments, the process may include wet compaction, wherein the process is carried out in a temperature ranging from room temperature (~25° C.) to 100° C.

According to these embodiments, in wet compaction the process includes the following steps:

Mixing Potash with Polyhalite, optionally with a binder suspension at room temperature;

Feeding the mixture into a compactor to provide wet compacted flakes;

Grinding of the flakes;

Sieving of the grinded flakes; and

According to some embodiments, after sieving there are three types of yield:
1. Desired sized flakes—from 1.4 to 33 mm thickness, S.G. between 1.9 to 2.4 g/cm3
2. Oversized (OS) flakes—are returned to the grinding stage, e.g., between 4-20% of the yield.
3. Undersized (US) flakes—are returned to the mixture for compaction According to these embodiments, the wet compaction process includes heating the desired size granules in order to evaporate any water residues from the granules, resulting in dry granules. According to some embodiments, the granules are heated to a temperature of between 100-160° C., preferably 140° C.

According to some embodiments the wet compaction process allows for the compaction of polyhalite at high concentrations from 10% to 100%, preferably 59% of polyhalite.

According to some embodiments, the binder suspension may include a binder which is immersed in water, wherein the binder in the wet process is preferably fly ash, calcium oxide and/or calcium hydroxide.

According to some embodiments, to the resulting flakes additives may be added, including for examples, nutrients, minerals, coating materials, sustained release compounds and the like.

According to some embodiments, the nutrients may include:

Nitrogen (N): leaf growth;

Phosphorus (P): Development of roots, flowers, seeds, fruit;

Potassium (K): Strong stem growth, movement of water in plants, promotion of flowering and fruiting;

three secondary macronutrients: calcium (Ca), magnesium (Mg), and sulphur (S);

micronutrients: copper (Cu), iron (Fe), manganese (Mn), molybdenum (Mo), zinc (Zn), boron (B), and of occasional significance there are silicon (Si), cobalt (Co), and vanadium (V) plus rare mineral catalysts.

According to some embodiments, the mixture of the present invention may also include additional fertilizer besides Potash and Polyhalite.

According to some demonstrative embodiments, the term "fertilizer" may include any material of natural or synthetic origin that is applied to soils or to plant tissues to supply one or more plant nutrients essential to the growth of plants, including, for example, Single nutrient ("straight") fertilizers such as Ammonium nitrate, Urea, calcium ammonium nitrate, superphosphate, e.g., "Single superphosphate" (SSP), phosphogypsum, Triple superphosphate (TSP) or a mixture thereof; Multinutrient fertilizers such as Binary (NP, NK, PK) fertilizers, e.g., monoammonium phosphate (MAP) and/or diammonium phosphate (DAP), NPK fertilizers which are three-component fertilizers providing nitrogen, phosphorus, and potassium; fertilizers which include one or more of the main micronutrients sources of iron, manganese, boron, molybdenum, zinc, and copper and the like; Compound fertilizers, e.g., which contain N, P, and K; Organic fertilizers such as peat, animal wastes, plant wastes from agriculture, and sewage sludge; and/or Other elements such as calcium, magnesium, and sulfur.

According to some embodiments, the fertilizer preferably includes one or more of nitrogen fertilizers such as ammonia, anhydrous ammonium nitrate, urea and sodium nitrate; Phosphate fertilizers; Potassium fertilizers, such as Potash, potassium chloride, potassium sulfate, potassium carbonate, or potassium nitrate According to some embodiments, the fertilizer is preferably Ammonium Sulphate.

According to some demonstrative embodiments, the sieving is done using a siever having opening with a diameter of between 1.4-4.5 mm preferably between 2-4 mm, most preferably 3.4 mm.

According to some embodiments, the mixing is performed in a blade blender and/or any other suitable devise capable of having a rotation speed that creates a swirling motion for a perfect homogenization and a high blending precision, e.g., a Ploughshare® Mixer.

According to some embodiments, the resulting flakes/granules may be glazed and further coated with a suitable coating. For example, the coatings may include biodegradable coatings, sustained release coatings, controlled release coatings, oily coatings, wax coatings.

The resulting Polyhalite and potash mixture may include the following properties as detailed in table 1

TABLE 1

| Chemical Properties | Concentration |
|---|---|
| Potassium ($K_2O$) | 37.0% Min. |
| Sulphur ($SO_3$) | 23.0% Min. |
| Magnesium (MgO) | 2.7% Min. |
| Calcium (CaO) | 8.1% Min. |
| $H_2O$ | 1.0% max |

The resulting Polyhalite and potash compacted product mixture may include the following particle size distribution as detailed in table 2

TABLE 2

| Particle size distribution | |
|---|---|
| Mesh Size (mm) | Typical Retained Range (%) |
| 4.00 | 5-15 |
| 2.80 | 50-80 |
| 2.36 | 75-95 |
| 2.00 | 90-99 |
| 1.00 | 99 minimum |

The resulting Polyhalite and potash mixture may include the following properties as detailed in table 3

TABLE 3

| Physical & Chemical properties | |
|---|---|
| Bulk Density | 1.34 T/m$^3$ |
| pH | Neutral |

Reference is now made to FIG. 1 which depicts a wet process 100 for the compaction of Polyhalite and Potash in accordance with some demonstrative embodiments described herein.

As shown in FIG. 1, wet process 100 may include a binder preparation step 108.

According to some embodiments, preparation step 108 can include the following steps: binder heating, mixing, grinding, activation, dissolution and curing, Step 106 depicts the addition of the binder to a pre-mixer 110, in which the pre-mixer 110 saves the homogenous composition of the binder mixture.

According to some embodiments, the binder is then added to a mixer 112 to which a feed of Polyhalite 102 is added together with a feed of Potash 104. According to some embodiments, in mixer 112 the Polyhalite, Potash and binder are homogenously mixed together to create a Polyhalite/Potash wet mixture ("the mixture").

According to some embodiments, the mixture may then be transferred to a compactor 114 to undergo compaction. The compactor may work in the follow conditions: high or low temperatures ranging from 80 to 190° C. preferable 150° C. and high force conditions ranging from 45 to 100 kN/cm, preferable 55 kN/cm and Flack thickness between 4 mm to 40 mm.

According to some embodiments, the mixture leaves compactor 114 as compacted masses which are then transferred to a crusher 116, and the masses are then crushed to finer particles in a size ranging from 0.1 mm to 20 mm According to some embodiments, the particles may undergo primary screening in a screener 118 with multiple decks between 1 mm to 6 mm, preferably 1, 2 and 5 mm.

According to some demonstrative embodiments, from screener 118 there may be yielded particles in 3 different size ranges:

1. Oversized particles 138 (also referred to herein as "OS") having a size diameter of more than 6 mm.
2. Undersized particles 134 (Also referred to herein as "US") having a size diameter between of below 1 mm.
3. Desired sized particles having a size diameter of between 1 to 6 mm According to some embodiments undersized particles 134 and/or any dust that may be formed while passing through screener 118 can be separately granulated and/or introduced back to the process, e.g., to mixer 112 to be mixed again with the mixture. The range of the undersized particles 134 and/or any dust that may be formed while passing through screener 118 can be between 0.1 to 1 mm.

Oversized particles 138 may go at least one crushing procedure to be crushed to a desired size.

For example, OS 138 may be transferred to crusher 120 and undergo a secondary screening in screener 122. Any particles having a desired size ranging between 0.1 mm to 20 mm that may result from screener 122 may be added back to screener 118.

Oversized particles 142 that result from screener 122 may undergo additional crushing in crusher 124, wherein particles yielded from crusher 124 are added back to screener 118 for further processing.

According to some embodiments, the differences between crusher 120 and 124 may be hammer mill or other kind of crushers.

According to some embodiments, the desired sized particles leaving screener 118 may go through a process of drying to drying any residual moisture from the particles and to yield dry particles.

The dry particles are then transferred to a polishing screener 128 to undergo an additional, finer, screening process 1 mm to 6 mm preferably 2 mm to 4 mm. According to some demonstrative embodiments, from polishing screener 128 there may be yielded particles in 3 different size ranges:

1. Oversized particles 140 (also referred to herein as "OS") having a size diameter over 6 mm
2. Undersized particles 136 (Also referred to herein as "US") having a size diameter under 1 mm
3. Final particles having a size diameter of 1 to 6 mm, preferably 2-4.75 mm.

According to some demonstrative embodiments the undersized particles 136 may be transferred back to mixer 112 to be mixed again with the mixture.

Oversized particles 140 may go through a crushing procedure to be crushed to a desired size.

For example, OS 140 may undergo crushing in crusher 124, wherein particles yielded from crusher 124 are added back to screener 118 for further processing.

According to some embodiments, the final particles yielded from polishing screener 128 may go through a process of glazing in glazer 130. According to some embodiments, the grazing system may prevent the abrasion and dust pollution during the transport. Glazer 130 may include a rotary drum, a drying can, various types of dryers, e.g., fluid bed dryer, or others The yield from glazer 130 is to be packaged as the final product 132 Reference is now made to FIG. 2 which depicts a dry process 200 for the compaction of Polyhalite and Potash in accordance with some demonstrative embodiments described herein.

Figure 2:
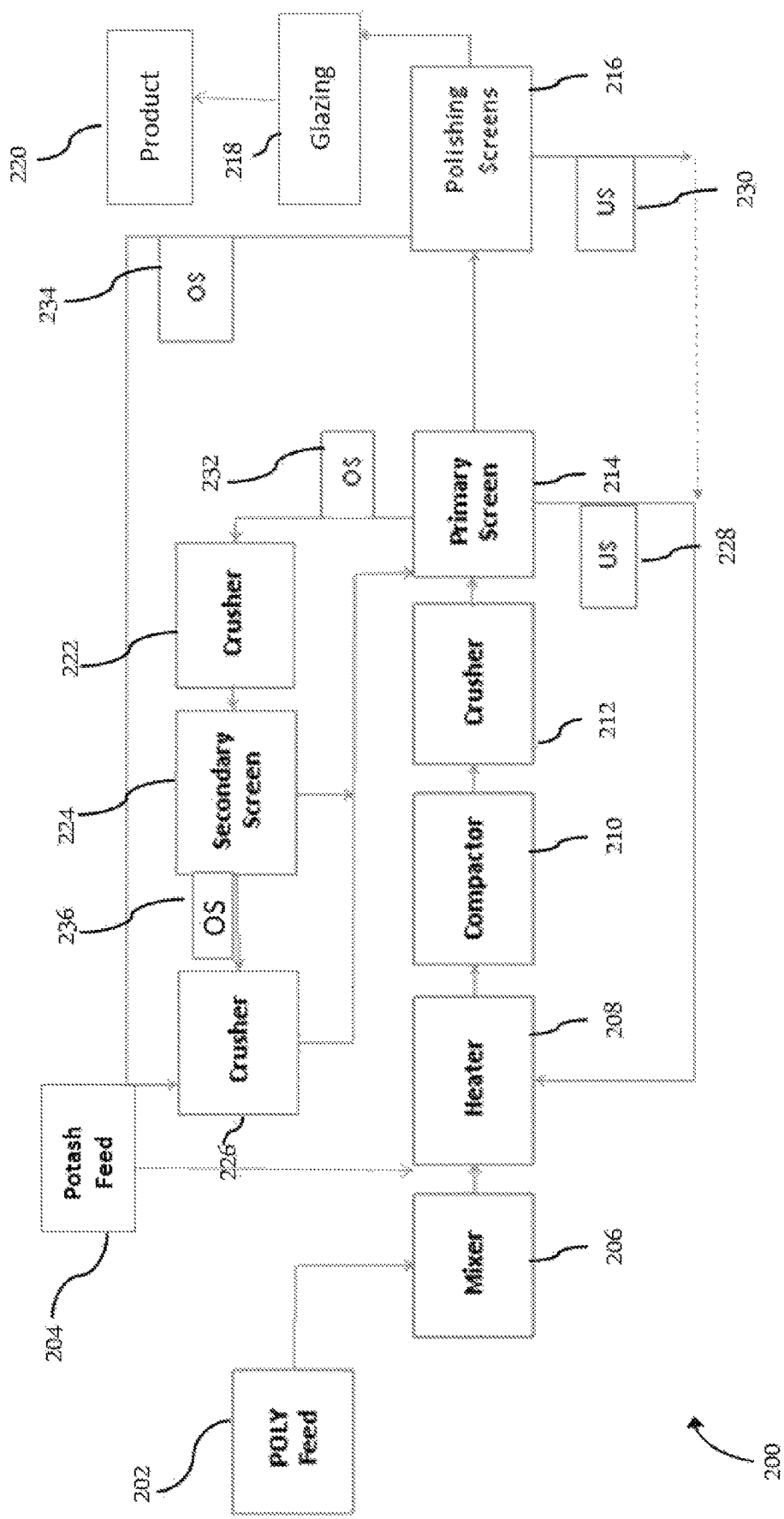
FIG. 2 is a schematic illustration of a dry process for the compaction of Polyhalite and potassium salt in accordance with some demonstrative embodiments.

As shown in FIG. 2, dry process 200 may include a feed of Polyhalite 202 which is added together with a feed of Potash 204 to a mixer 206.

According to some embodiments, in mixer 206 the Polyhalite and Potash are homogenously mixed together to create a Polyhalite/Potash dry mixture ("the dry mixture").

According to some embodiments, the dry mixture may then be transferred to a Heater 208 to heat the material to compacting process between 80 to 190 degrees, preferably 170 degrees.

According to some embodiments, the heated dry mixture may then be transferred to a compactor 210 to undergo compaction and yield compacted masses. According to some embodiments, the compaction parameters may include high temperatures ranging from 80 to 190° C. preferably 150° C. and high force conditions ranging from 45 to 100 kN/cm, preferable 55 kN/cm and Flack thickness between 14 mm to 37 mm.

According to some embodiments, the compacted masses are then transferred to a crusher 212, and the masses are then crushed to finer particles According to some embodiments, the particles may undergo primary screening in a screener 214 with multiple decks between 1 mm to 6 mm, preferable 1, 2 and 5 mm.

According to some demonstrative embodiments, from screener 214 there may be yielded particles in 3 different size ranges:

1. Oversized particles 232 (also referred to herein as "OS") having a size diameter of having a size diameter of more than 6 mm.
2. Undersized particles 228 (Also referred to herein as "US") having a size diameter of less than 1 mm.
3. Desired sized particles having a size diameter between 1 to 6 mm According to some embodiments undersized particles 228 and/or any dust that may be formed while passing through screener 214 can be separately granulated and/or introduced back to the process, e.g., to mixer 206 or heater 208. The range of the undersized particles 228 and/or any dust that may be formed while passing through screener 214 can be between 0.1 to 1 mm.

According to some demonstrative embodiments the undersized particles 228 may be transferred back to heater 208.

Oversized particles 232 may go at least one crushing procedure to be crushed to a desired size.

For example, OS 232 may be transferred to crusher 222 and undergo a secondary screening in screener 224. Any particles having a desired size ranging between 1 to 6 mm preferable 2 mm to 4 mm that may result from screener 224 may be added back to screener 214.

Oversized particles 236 that result from screener 224 may undergo additional crushing in crusher 226, wherein particles yielded from crusher 226 are added back to screener 214 for further processing.

According to some embodiments, the differences between crusher 222 and 226 may be the kind of crusher and operational parameters.

According to some embodiments, the desired sized particles leaving screener 214 may go through a polishing screener 216 to undergo an additional, finer, screening process. 1 to 6 mm preferable 2 mm to 4 mm According to some demonstrative embodiments, from polishing screener 216 there may be yielded particles in 3 different size ranges:

1. Oversized particles 234 (also referred to herein as "OS") having a size diameter higher than 6 mm
2. Undersized particles 230 (Also referred to herein as "US") having a size diameter lower than 1 mm
3. Final particles having a size diameter of 1-6 mm, preferably between 2-4 mm.

According to some demonstrative embodiments the undersized particles 230 may be transferred back to heater 208.

Oversized particles 234 may go through a crushing procedure to be crushed to a desired size.

For example, OS 234 may undergo crushing in crusher 226, wherein particles yielded from crusher 226 are added back to screener 214 for further processing.

According to some embodiments, the final particles yielded from polishing screener 216 may go through a process of glazing in glazer 218. According to some embodiments, the glazing system may prevent the abrasion and dust pollution during the transport. Glazer 218 may include a rotary drum, and dryer, can be used various types of dryers, e.g., fluid bed dryer, rotary dryer or others The yield from glazer 218 is to be packaged as the final product 220.

EXAMPLES

Example-1

The following conditions were set:

| Feeding material Equipment | Units | 1. 50% w Polyhalite standard grade<br>2. 50% w Potash standard grade<br>Value/Description |
|---|---|---|
| Feed Temp | ° C. | 160-170 |
| Feed Rate | ton/h | 40 |
| Motor power | kW | 710 |
| Roll Width | mm | 800 |
| Roll speed | [RPM] | 18 |
| Linear speed | [m/s] | 0.94 |
| Roll Diameter | [cm] | 1000 |
| Flake specific weight | g/cm3 | >2.263 |
| Pressure Ratio | | 0.9 |
| Off load Gap | [mm] | 16 |
| Working Gap | [mm] | 20 |
| Force | [kN/c | 44 |
| Specific force | [kN/(c | 2.6-3.1 |
| Specific Pressing Force | kN/cm | 54.4-59 |
| Screw Speed | rpm | 93-96 |
| Recycle Ratio | | High (preferably estimated based on the flakes' size) |
| 1$^{st}$ Crusher Speed | rpm | 473-1500 |
| 2$^{st}$ Crusher Speed | rpm | 473-1599 |
| Hammer Speed | | 500-1500 |
| Dust trap system | | Filter/cyclon |

Specification of the Resulting Product

| | |
|---|---|
| Granulometry | 2-4 mm |
| % H2O | <0.1% |
| Abrasion (−12) | <30% |
| Abrasion (−32) | <19% |
| Single Strength | >2 kgForce/granule |
| Dust after abrasion (%) | 1.35 |
| Caking (Kg/cake) | <8 |
| Environmental dust | <0.05 |

While this invention has been described in terms of some specific examples, many modifications and variations are possible. It is therefore understood that within the scope of the appended claims, the invention may be realized otherwise than as specifically described.

The invention claimed is:

1. A process for the compaction of Polyhalite with a Potassium salt, wherein said process comprising:
   mixing a feed of polyhalite with a feed of said Potassium salt in a mixer to yield a mixture;
   compacting said mixture in a compactor to yield masses;
   crushing said masses in a crusher to yield particles; and
   screening said particles in a screener to yield particles in three different sizes: oversized fine particles which undergo a second crushing process and are retuned to said screener for screening, undersized fine particles which are transferred to said mixer for further mixing and compacting, and desired size fine particles which are transferred to a polish screener for glazing and oiling.

2. The process of claim 1, wherein said Potassium salt includes at least one of Potash, Potassium Nitrate and Potassium Sulphate.

3. The process of claim 1, wherein said process is a wet process including the addition of a binder.

4. The process of claim 3, wherein said binder is added to the mixer with said feed of polyhalite and said feed of Potassium salt.

5. The process of claim 4, wherein said binder is selected from the group including starch, bentonite, sodium silicate, lignosulfonates, molasses, hydrated lime, bitumen, Portland cement, clay, acids (nitric, hydrochloric, phosphoric, sulphuric), cellulose gum, sucrose, water, water glass, cements, Fly Ash, Potassium and Sodium Silicate, MgO, CaO, Alganite, Geo-polymers, oils and waxes and the like, or a combination thereof.

6. The process of claim 1 wherein said process is a dry process wherein said mixture is heated in a heater after being mixed in said mixer.

\* \* \* \* \*